United States Patent
Schiegg et al.

(10) Patent No.: US 12,456,048 B2
(45) Date of Patent: Oct. 28, 2025

(54) DETERMINING AN OUTPUT SIGNAL BY AGGREGATING PARENT INSTANCES

(71) Applicant: Robert Bosch GmbH, Stuttgart (DE)

(72) Inventors: Martin Schiegg, Korntal-Muenchingen (DE); Xiahan Shi, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1138 days.

(21) Appl. No.: 17/080,365

(22) Filed: Oct. 26, 2020

(65) Prior Publication Data
US 2021/0133567 A1 May 6, 2021

(30) Foreign Application Priority Data

Oct. 30, 2019 (EP) .................................... 19206119
Oct. 31, 2019 (EP) .................................... 19206484

(51) Int. Cl.
*G06N 3/08* (2023.01)
*G05B 13/02* (2006.01)

(52) U.S. Cl.
CPC ............. *G06N 3/08* (2013.01); *G05B 13/027* (2013.01)

(58) Field of Classification Search
CPC .......... G06N 3/08; G06N 3/044; G06N 3/045; G06N 3/042; G06N 3/047; G05B 13/027; B60W 50/00; G06F 2218/12; G06F 18/214; G06F 18/22; G06F 18/2415
See application file for complete search history.

(56) References Cited

U.S. PATENT DOCUMENTS

| | | | |
|---|---|---|---|
| 9,983,670 B2 * | 5/2018 | Coleman | G16H 40/60 |
| 11,093,714 B1 * | 8/2021 | Bhatia | G06N 3/044 |
| 11,782,451 B1 * | 10/2023 | Venkatraman | G05D 1/0221 |
| | | | 701/26 |

(Continued)

FOREIGN PATENT DOCUMENTS

WO 2018211143 A1 11/2018

OTHER PUBLICATIONS

Louizos, C. et al., "The Functional Neural Process," Cornell University, 2019, pp. 1-18. <https://arxiv.org/abs/1906.08324>.

(Continued)

*Primary Examiner* — Hien L Duong
(74) *Attorney, Agent, or Firm* — NORTON ROSE FULBRIGHT US LLP

(57) ABSTRACT

A computer-implemented method of training a function for use in controlling or monitoring a physical system operating in an environment. The function maps an input instance comprising sensor measurements to an output signal. The function is parameterized by a set of parameters including representations of multiple reference instances. Given a training input instance, a number of reference instances are identified as being similar to the training input instance, and their representations and/or output signals are aggregated into an aggregate latent representation for the training input instance. Based on this aggregate latent representation, an output signal for the training input instance is determined, which is compared to a training output signal to derive a training signal. At least a representation of a reference instance is adjusted according to the training signal, obtaining a reference instance not comprised in the training dataset.

14 Claims, 5 Drawing Sheets

(56) References Cited

U.S. PATENT DOCUMENTS

| | | | | |
|---|---|---|---|---|
| 2017/0185894 | A1* | 6/2017 | Volkovs | G06N 3/08 |
| 2018/0157934 | A1* | 6/2018 | Hu | G05D 1/0246 |
| 2018/0336464 | A1* | 11/2018 | Karras | G06V 10/955 |
| 2019/0095417 | A1* | 3/2019 | Xu | G06F 40/211 |
| 2019/0147331 | A1* | 5/2019 | Arditi | G01C 21/32 |
| | | | | 706/20 |
| 2020/0089246 | A1* | 3/2020 | McGill, Jr. | G05D 1/0221 |
| 2020/0311110 | A1* | 10/2020 | Walker | G06N 3/08 |
| 2020/0364611 | A1* | 11/2020 | Cho | G06N 3/088 |
| 2021/0026355 | A1* | 1/2021 | Chen | G01S 17/89 |
| 2021/0097401 | A1* | 4/2021 | Ramalho | G06N 3/045 |
| 2021/0104231 | A1* | 4/2021 | Jeon | G10L 15/16 |
| 2021/0158162 | A1* | 5/2021 | Hafner | G06N 3/006 |

OTHER PUBLICATIONS

Kingma, D. et al., "Adam: a Method for Stochastic Optimization," Cornell University, 2017, pp. 1-15. < https://arxiv.org/abs/1412.6980>.

* cited by examiner

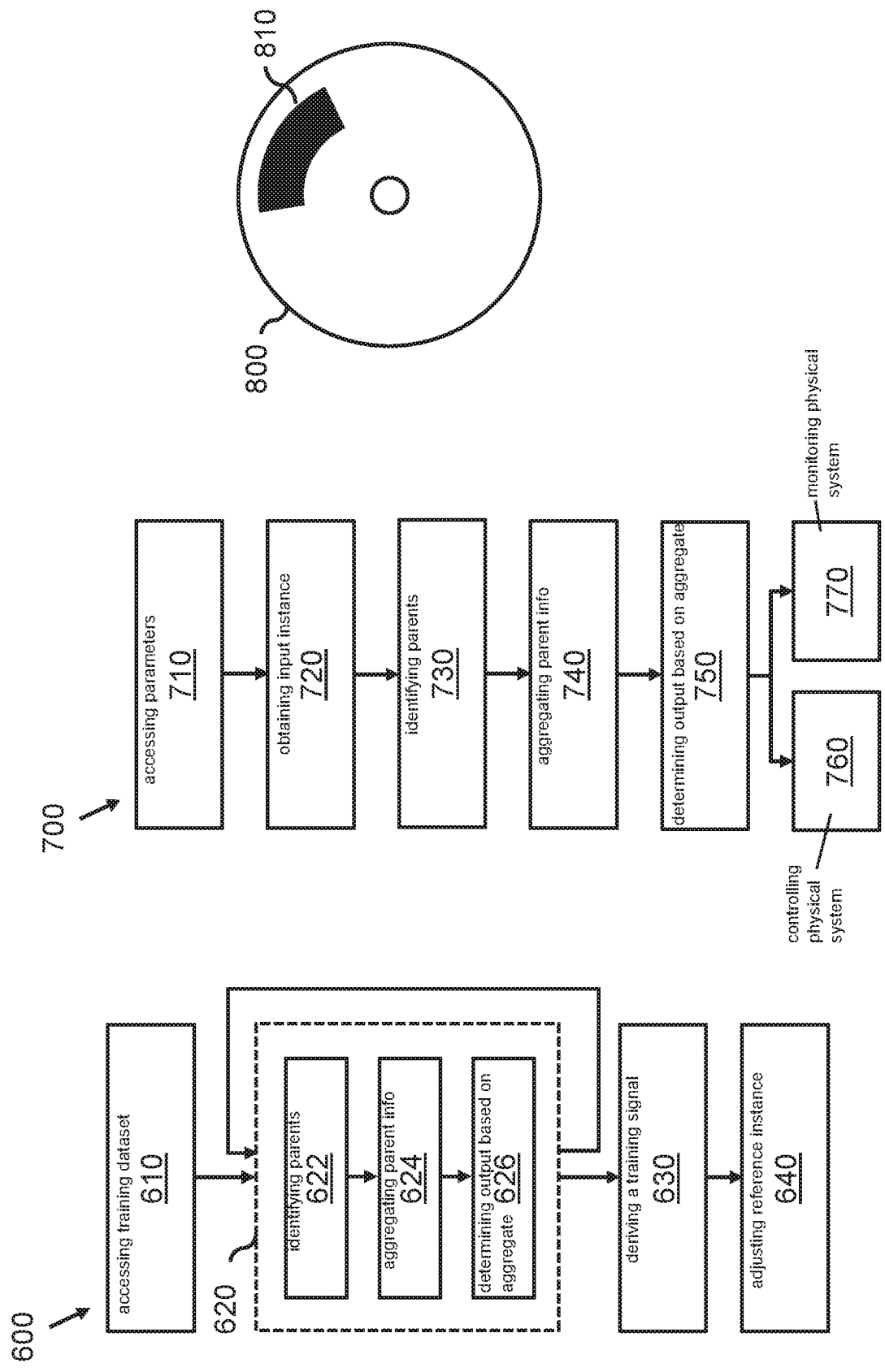

DETERMINING AN OUTPUT SIGNAL BY AGGREGATING PARENT INSTANCES

CROSS REFERENCE

The present application claims the benefit under 35 U.S.C. § 119 of European Patent Application No. EP 19206119.0 filed on Oct. 30, 2019, and European Patent Application No. EP 19206484.8 filed on Oct. 31, 2019, which are both expressly incorporated herein by reference in their entireties.

FIELD

The present invention relates to a computer-implemented method of training a function for use in controlling or monitoring a physical system operating in an environment and to a corresponding system. The present invention further relates to a computer-implemented method of applying a function for controlling or monitoring a physical system operating in an environment, and to a corresponding system. The present invention further relates to a computer-readable medium.

BACKGROUND INFORMATION

Prediction tasks show up frequently in computer vision. For example, autonomous device control, e.g., for autonomous cars, depends on decision-making based on reliable classification. One of the problems with predictions made by machine learning systems is that there is often little distinction between predictions for cases in which the system is well-trained and predictions for cases in which the system is not well-trained. For example, consider a neural network trained to classify road signs. If the network is presented with a new, not previously seen road sign, then the neural network will likely make a confident and probably correct classification. However, if the neural network is presented with an image outside the distribution of images used for training, say an image of a cat, then a conventional neural network is prone to sill confidently predict a road sign for the image. This is undesirable behaviour, especially in safety-critical applications such as self-driving cars, where one also desires accurate uncertainty estimates about the predictions. For example, there is therefore a need for machine learning systems which fail gracefully when presented with such an image. For example, prediction may fall back to a default or close thereto for points outside the data distribution.

Bayesian neural networks have been an attempt at imbuing neural networks with the ability to model uncertainty. They posit a prior distribution over the weights of the network and through inference they can represent their uncertainty in the posterior distribution. However, attempts to apply Bayesian neural networks in self-driving cars or other practical applications are hampered by the difficulty of choosing a prior that leads to satisfactory accuracy. One reason is that understanding the interactions of the parameters with the data is a non-trivial task. As a result, priors are usually employed for computational convenience and tractability. Furthermore, inference over the weights of a neural network is very complex due to the high dimensionality and posterior complexity.

As an alternative to the above approach, in the paper "The Functional Neural Process" by C. Louizos et al. (available at https://arxiv.org/abs/1906.08324 and incorporated herein by reference), a family of exchangeable stochastic processes, called Functional Neural Processes (FNPs), is proposed. FNPs model distributions over functions by learning a graph of dependencies on top of latent representations of the points in the given dataset. Specifically, a random subset of points of the training dataset is chosen as a reference set, and the probability distribution over the functions is the based around those points. This way, a Bayesian model is obtained without explicitly positing a prior distribution over latent global parameters; instead, priors are adopted over the relational structure of the given dataset. Predictions for new points are made via their posterior predictive distribution.

SUMMARY

In accordance with a first aspect of the present invention, a computer-implemented method of training a function for use in controlling or monitoring a physical system operating in an environment is provided. In accordance with another aspect of the present invention, a computer-implemented method of applying a function for controlling or monitoring a physical system operating in an environment is provided. In accordance with another aspect of the present invention, a system for training a function for use in controlling or monitoring a physical system operating in an environment is provided. In accordance with a further aspect of the present invention, a system for applying a function for controlling or monitoring a physical system operating in an environment is provided. In accordance with an aspect of the present invention, a computer-readable medium is provided.

Various embodiments relate to functions used to determine output signals for use in controlling or monitoring a physical system operating in an environment. The input instances to which such functions are applied, typically comprise one or more sensor measurements, e.g., measuring physical characteristics of the physical system itself and/or the environment. For example, such a function may be applied in a monitoring system for monitoring a vehicle engine, for example, to perform classification or regression tasks on incoming sensor measurements based on which the monitoring can take place. For example, an anomaly may be detected, or it may be predicted that a physical quantity will exceed a certain predefined threshold, e.g., a too high temperature or emission value. As a further example, an output signal of a function as described herein may be used in a control system of an autonomous device such as an autonomous or semi-autonomous vehicle. For example, a vehicle control system may cause the vehicle to brake based on classifying a dangerous object that the vehicle is at risk of colliding with, etcetera. For example, the sensor measurements may comprise camera images, for example taken by a camera installed in a car or an external camera, e.g., images of a road-side camera used to control a vehicle.

Various embodiments employ functions that base their output signal for an input instance on information about multiple reference instances. The number (or plurality) of reference instances is typically much smaller than the size of the training dataset, e.g., at most 1% or at most 0.1% of the size. For example, the number of reference instances may be at most 100, at most or at least 250, or at most or at least 1000. The training dataset may comprise at least 10000 training instances, at least 50000 training instances, etc.

A number of reference instances may be identified as similar to an input instance based on a similarity between the input instance and the multiple reference instances, for example, determined according to a similarity function. Information about those reference instances may then be taken into account to determine the output signal. For example, a classification of a sensor reading may be based on classifications of similar reference sensor readings. The similarity function used to determine similarities between instances and/or the function used to determine the output signal based on the reference instances may be trainable functions, e.g., parameterized by parameters that are learned when training the function. The information from parent instances that is taken into account may include the parent instances themselves or information derived from them, e.g., latent representations, and/or reference output signals of the parent instances.

In various embodiments of the present invention, the function may be a stochastic function as opposed to a deterministic function. Such a function may be used to obtain not just an output signal, e.g., a classification or a prediction, but also a confidence value of that output signal. Such confidence values are especially useful when the output signal of the function is used to effect any sort of action in a physical environment. For example, a system, such as a self-driving vehicle or a medical decision support system, may refrain from making automatic decisions when the confidence value fails to exceed a given threshold. In such settings, functions that take reference instances into account are particularly useful since similarity to reference instances provides useful feedback to base such a confidence value on. For instance, high confidence output signals may be provided in areas of a training dataset where a relatively large number of consistent training inputs and output signals are available. However, also for deterministic functions it can be useful to use reference instances, e.g., in cases where output signals for those reference inputs provide a representative view of the input/output relation from which output signals for other inputs can be efficiently inferred.

As the inventors realized, when applying trained functions in practice, it is important, e.g., for accuracy reasons, to use an appropriate set of reference instances. For example, it would be possible to take a subset from the training dataset as reference set, but in if that was done, the selected reference instances might be relative similar to each other. As a consequence, in such cases, the reference instances might contain redundant information, so that a relatively large set of reference instances might be needed to obtain a given accuracy, or, given a certain amount of reference instances, accuracy might not be optimal. On the other hand, less frequent variations of the data distribution might be under-represented in the reference set in such cases.

Interestingly, however, the inventors envisaged a better way to obtain reference instances than by random selection from the training dataset. In fact, the inventors realized that the reference instances do not need to be selected from the training dataset at all: instead, representations of the multiple reference instances can be learned as learned as parameters of the function being trained. During training, an output signal of the function for a training input instance may be obtained, and compared to a training output signal for that training input to derive a training signal. For example, a difference between the output signal and the training output signal may be determined; or, if the function provides a probability distribution as output signal, a likelihood may be determined of the training output signal being sampled according to this probability distribution. Thus, the training signal may indicate how well the function performs on the training instance. According to this training signal, some or all representations of reference instances may be adjusted. For example, the training may comprise repeatedly adjusting the representations of the reference instances, possibly in combination with other parameters of the function, for example, in a gradient-descent type update step. The adjusted reference instances are typically synthetic, in the sense that they are not comprised in the training dataset but instead determined as parameters during the training.

By determining the reference instances by training, a more representative and optimized set of reference instances may be obtained. For example, in areas of the input space where there are a lot of training input instances with varying training output signals, a relatively large amount of reference instances may be placed so that, in use, enough relevant parent instances are available to base the output of the function on. On the other hand, in areas of the input space where the training output signals are consistent, having a smaller amount of reference instances may suffice. For example, a cluster of several training instances with consistent output signals may be represented by a single reference instance, which does not need to be a real training instance and which in fact does not even need to represent a realistic training example. Interestingly, by adjusting representations of reference instances based on the performance of the resulting function, reference instances may be automatically determined that are most suitable for the function at hand. Thus, an increase in performance, e.g., accuracy, of the model can be obtained. Looking at it from another other way, given a desired performance level, that level can be achieved using fewer reference instances, e.g., less memory and/or less computing power may be needed to achieve the performance level.

Interestingly, still, the amount of computational overhead of training these improved functions can be relatively modest. Because of the insight of the inventors that reference instances can be synthetic, e.g., do not need to be selected from the training dataset, the reference instances can be determined using efficient training techniques, e.g., continuous optimization-based techniques. When reference instances would be selected from the training dataset, making an optimal selection would effectively result in a discrete optimization problem that would be hard to solve, even approximately. In contrast, synthetic reference instances can be optimized using continuous optimization, e.g., by iteratively updating the reference instances to optimize an objective function, e.g., a loss function that is increasing in the difference between the determined output signal for a training input instance and the corresponding training output signal. Accordingly, the use of synthetic instances may not only allow a better set of reference instances to be obtained, as discussed previously, but also to obtain the set of reference instances in a more efficiency way compared to trying to find a suitable subset of the training dataset.

Interestingly, by the above measures, uncertainty in the training dataset can be taken into account without having to learning distributions over possible constellations of a large amount of weights of the neural network, as sometimes seen in the prior art. It may be avoided to have to choose an accurate prior distribution over such weights, which can be especially difficult when there are many weights and it is difficult to see what a particular choice of weight distribution means for an overall model. Also performing the difficult task of doing inference, e.g., training the model and getting the posterior, over these many weights, may be avoided. In contrast, a similarity function, e.g., a latent representation and kernel, may be much less complicated and it is generally much more feasible to provide a meaningful prior in this case.

In various embodiments of the present invention, the use of the improved trained functions does not just encompass obtaining a function that is trained in an improved way, e.g., as discussed above, but also applying the function in a different way. For example, the use of the function may comprise obtaining a representation of a reference instance in a latent space of the similarity function of the function, instead of obtaining the reference instance itself. Instead or in addition, the use of the function may comprise determining an aggregate latent representation for an input instance by determining output signals of the function for the identified parent instances using the output function. These and other examples of modifications to the way the trained function is used are discussed in more detail below.

The function for determining output signals from input instances can be put into various practical uses. Typically, the input instances comprise sensor data, e.g., image data, video data, radar data, LiDAR data, ultrasonic data, motion sensor data, etc, measured in a physical environment. The function may be configured to perform, for example, a regression or a classification task on the input instance to obtain the output signal. Based on the determined output signal, a control signal may be determined to effect action in the physical environment where the sensor data was measured.

For example, the function may be applied in a computer-controlled system as is conventional. Such systems typically include, or otherwise have access to, one or more sensors to obtain measurements of the environment, and one or more actuators to perform actions that affect the environment. A processor subsystem of the system may determine the action based on the sensor measurements, based at least in part on an output signal of a function as described herein. Computer-controlled systems include robotic systems, in which a robot can perform one or more tasks automatically, e.g., under control of an external device or an embedded controller. Further examples of systems that can be computer-controlled are vehicles and components thereof, domestic appliances, power tools, manufacturing machines, personal assistants, access control systems, drones, nanorobots, and heating control systems.

As a concrete example of a classification task, the function may be used in a perception module of an autonomous agent, e.g., a robot or a self-driving vehicle, to perform classification of detected objects, for example, in a camera image or other type of sensor input. As an example of a regression task, the function may be used to estimate one or more physical quantities of a complex system based on one or more other physical quantities, e.g., to predicting emission of a vehicle engine based on various inputs and calibration parameters.

Interestingly, apart from an output signal also a confidence value of the output signal may be determined, as discussed herein. This is particularly useful in self-driving vehicles, medical decision support systems, automatic quality control systems, and the like. For example, in the case of a classification, a confidence value, e.g., a predictive entropy, may express whether the function thinks the input is likely to be from a particular class, e.g., indicated by low entropy, or whether the function is not sure, e.g., it thinks that all classes are equally probable, e.g., indicated by high entropy. In the case of regression, the confidence value may indicate a confidence interval in which the output signal is likely to lie. In particular, the confidence value may indicate that the input instance is not from the same distribution or domain as the training dataset used to train the function. The confidence value may be used in a control signal in various ways, e.g., the system can refrain from making automatic decisions when uncertain, operate in a safe mode, or consult a human.

In various embodiments of the present invention, the trained function is also used to generate training data, e.g., to refine a further model being trained on the same training dataset. For example, based on instances from the training dataset or perturbations thereof, output signals of the function may be determined. A further machine learning model may then be trained on these instances and determined output signals. This way, the further machine learning model can be trained on a larger datasets and/or datasets of situations for which it is hard to obtain training data, e.g., dangerous traffic situations, rare combinations of weather and/or traffic conditions, etcetera, resulting in a better machine learnable model without the need to perform further real physical measurements. Also, the trained further machine learning model may be applied to actual input instances, where increased accuracy may be achieved. Similarly, the trained function may be used in an active learning system, wherein confidence values determined as described herein are used as a basis for decisions to acquire further data.

As discussed, in various embodiments of the present invention, information about identified parent instances is aggregated into an aggregate latent representation for an input instance. Typically, this information includes reference output signals of the identified parent instances. Since parent instances are typically synthetic reference instances that are not from the training dataset, also such reference output signals typically do not come from the training dataset. There are several ways in which such reference output signals can still be obtained.

Optionally, the reference output signals of the reference instances are included in the set of parameters along with the representations of the reference instances themselves, and learned as part of training the function. For example, both the representation of a reference instance and its output signal may be adjusted according to a training signal. This way, the reference output signals can be optimized automatically to provide the best performance of the resulting function.

Optionally, reference output signals of at least some of the reference instances are not stored as part of the set of parameters, but determined when needed. In particular, when determining the output signal for an input instance, reference output signals may be determined for reference instances identified as parent instances of the input instance. As the inventors realized, since there is no ground truth available for synthetic reference instances, their reference output signals may to a large degree be redundant with respect to the reference instances themselves and thus efficiency can be improved, and over-fitting avoided, by avoiding to store them in the set of parameters.

In embodiments of the present invention where the similarity function is a stochastic function as described in more detail herein, it is particularly beneficial to determine reference output signals when applying the model rather than storing them as parameters. This is because it allows to take uncertainty regarding the reference output signals into account: different samples of the output signal may be based on different reference output signals, sampled in accordance with their uncertainty. Taking this uncertainty into account may thus result in a more accurate distribution of output signals and/or may reduce distorting effects caused by reference inputs for which the output signal is uncertain.

Optionally, in order to determine the reference output signal of a reference instance P, the function itself may be applied, comprising, e.g., determining parent instances of instance P and aggregating them into an aggregate latent representation for P, and determining the reference output signal based on this aggregate latent representation using the output function. It is possible, when aggregating the parents of P, to include reference output signals for these parents. These reference output signals may be determined in turn by applying the function. For instance, an acyclic directed graph on the multiple reference points may be sampled, an edge of the graph between a first reference node and a second reference instance indicating that the first reference instance is identified as a parent of the second reference instance, a reference output signal for a reference instance being determined based on reference output signals of parent instances of the reference instance as indicated by the graph.

Optionally, representations of parents of a parent instance P are aggregated without including reference output signals for those parents of P. Accordingly, reference output signals can be sampled without the need to sample reference output signals of their parents first. This is especially beneficial since it allows more parallelism to be applied when sampling output signals. This may significantly improve performance, especially during training. Still, a structured posterior approximation may be obtained in the sense that a latent representation of a point depends on other related points, e.g., the parents.

Reference instances may be represented in the set of parameters in various ways. In an embodiment, some or all of the reference instances are simply comprised in the set of parameters; in other words, the reference instances are stored in the form of input instances to which the function cay be applied. This allows for maximal compatibility with conventionally trained functions, e.g., if both the reference instance and the corresponding reference output signal are stored in the set of parameters, then techniques to apply a conventionally trained function may be applied with few changes.

Optionally, some or all of the reference instances are represented in the set of parameters as elements of the latent space of the similarity function used to identify parent instances. For example, the similarity function may be configured to determine similarities by comparing latent representations of instances, in which case the reference instances may be represented in the set of parameters by means of this latent representation. However, it is not necessary to use the latent representation that is used to finally perform this comparison, e.g., also intermediate latent representations between the reference instance and the representation used for the comparison can be used. As the inventors realized, the use of such latent representations greatly reduces the number of parameters of the trained model and thereby reduces the risk of overfitting. This can also make training more efficient, e.g., fewer iterations may be needed, and decrease the amount of storage and computational resources needed when applying the model.

Optionally, the function is configured to determine a similarity between an input instance and a reference instance by determining a latent representation of the input instance in a latent space according to a trainable function, and comparing said latent representation to a representation of the reference instance in the latent space. For example, the latent representation may be determined with a trainable neural network, the comparison being performed by a kernel function, e.g., a kernel function that is conventional such as the di-graphon kernel. Using latent representations to perform the comparison may not only provide an efficient and efficiently trainable way of comparing instances, but also allows reference instances to be represented by their latent representations in the set of parameters, as explained above.

Optionally, the function is configured to determine the aggregate latent representation for an input instance by mapping information about respective identified parent instances into respective latent representations of the parent instances and combining the respective latent representations with each other, e.g., as a sum or by using a trainable recurrent neural network unit. As also discussed herein, the information about the parent instances that is aggregated may include the parent instance itself, a latent representation of the parent instance, e.g., coming from the similarity function, and/or a reference output signal corresponding to the reference instance. The way that parent instances are mapped into latent representations may itself be learned, e.g., using one or more encoders each encoding some or all information about the parent instance.

Optionally, the function may be configured to determine the output signal using a trainable output function. Conventional trainable functions for classification, e.g., two-class or multi-class classification, and/or regression, e.g., single-dimensional or multi-dimensional, may be used. For example, a stochastic output function for classification may output multiple output labels and multiple corresponding output probabilities, from which an output signal may be sampled and/or a confidence value computed.

Optionally, the similarity function and/or the aggregation function and/or the output function are stochastic functions configured to output parameters of a probability distribution. For example, the similarity function may be regarded as a stochastic function in the sense of providing a probability of a reference instance being a parent of another instance. By virtue of these subfunctions providing probability distributions, the overall trained function may be a stochastic function. A sample of the output signal may be obtained by sampling from the respective subfunctions. For example, starting from an input instance, parent instances may be sampled, based on which an aggregate latent representation may be sampled, based on which the output signal may be sampled. To increase accuracy, multiple samples for the output signal may be taken and averaged. Based on multiple such samples, a confidence value for an input instance may be determined. If the output function is stochastic, then the confidence value can also be derived based on the probability distribution parameters returned by the output function, although this is typically still done multiple times to take into account stochasticity of the other functions. Generally, the probability distributions can be discrete or continuous. For example, a function can return a mean and a standard deviation from which a continuous output signal can be sampled according to a normal distribution, or a probability value from which a binary output signal can be sampled according to a Bernoulli distribution.

Optionally, the similarity function and/or the aggregation function and/or the output function comprises a neural network. Neural networks are also known as artificial neural networks. Examples include deep neural networks and convolutional neural networks. For example, the similarity function and/or the aggregation function may include neural networks to determine latent representations. The set of parameters to be learned may comprise weights of nodes of the neural network. For example, the number of layers of a neural network may be at least 5 or at least 10, and the number of nodes and/or weights may be at least 1000 or at least 10000. Various conventional architectures for neural networks and other types of machine learnable models may be used. It is beneficial from the point of view of efficiency of training to use a model which is amenable to gradient-based optimization, e.g., which is continuous and/or differentiable in its set of parameters.

Optionally, the representations of the multiple reference instances are initialized based on the training dataset. Various initialization strategies, e.g., taking a random subset of training instances, or k-means clustering centres, are discussed throughout. In any case, compared to randomly initializing the reference instances as would be conventional for parameters of a learnable function, initializing them specifically based on the training dataset can greatly speed up convergence and help to reach a representative set of reference instances.

Optionally, the set of parameters further comprises parameters of the similarity function and/or the aggregation function and/or the output function. The training may further comprise adjusting the parameters of the similarity function and/or the aggregation function and/or the output function according to a training signal. Generally, at least some of the other parts of the function are trained along with the set of reference instances. For instance, the training may comprise multiple iterations, wherein the set of parameters are trained in a first subset of iterations, and the similarity function and/or the aggregation function and/or the output function are trained in a second subset of iterations, the first subset and second subset being temporally interleaved in the multiple iterations. It is possible that the same training signal is used both to update the set of reference instances and other parameters of the function, but is also possible that separate training signals are used. The reference instances may also be learned at a different rate than other parameters of the function. It is also possible to learn the reference instances after some or all of the other parameters are already learned, e.g., a conventionally learned function may be improved by refining reference instances selected from the training dataset into better performing synthetic instances.

To perform the training of the reference instances and/or other parameters, training methods may be used that are conventional. Typically, training is performed using stochastic approaches such as stochastic gradient descent, e.g., using the Adam optimizer as described in in Kingma and Ba, "Adam: A Method for Stochastic Optimization" (available at https://arxiv.org/abs/1412.6980 and incorporated herein by reference). As is conventional, such optimization methods may be heuristic and/or arrive at a local optimum. In particular, in various embodiments, an objective function is optimized comprising an evidence lower bound (ELBO) loss, gradient descent being used to update some or all parameters of the function to be trained. In case of a stochastic output function for example, the evidence lower bound can be based on a likelihood of obtaining a training output signal corresponding to a training input according to the probability distribution returned by the output function. Training may be performed on an instance-by-instance basis or in (mini-)batches, e.g., of at most or at least 64 or at most or at least 256 instances.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the embodiments described by way of example in the description below and with reference to the figures.

FIG. 6 shows a computer-implemented method of training a function for use in controlling or monitoring a physical system operating in an environment, in accordance with an example embodiment of the present invention.

FIG. 7 shows a computer-implemented method of applying a function for controlling or monitoring a physical system operating in an environment, in accordance with an example embodiment of the present invention.

FIG. 8 shows a computer-readable medium comprising data, in accordance with an example embodiment of the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
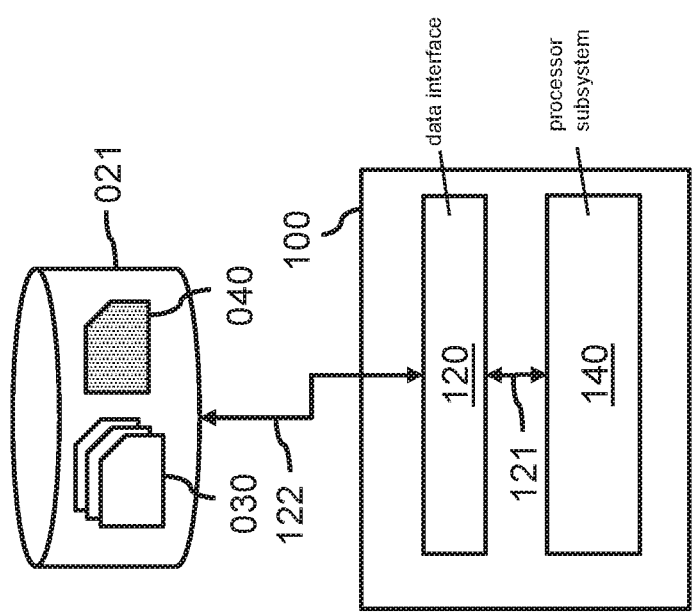
FIG. 1 shows a system for training a function for use in controlling or monitoring a physical system operating in an environment, in accordance with an example embodiment of the present invention.

FIG. 1 shows a system 100 for training a function for use in controlling or monitoring a physical system operating in an environment, in accordance with an example embodiment of the present invention. The function may map an input instance comprising one or more sensor measurements to an output signal for use in said controlling or monitoring. The function may be parameterized by a set of parameters 030. The set of parameters may include representations of multiple reference instances. The system 100 may comprise a data interface 120 and a processor subsystem 140 which may internally communicate via data communication 121. Data interface 120 may be for accessing a training dataset 030 for training the function. The training dataset may comprise multiple training input instances and corresponding training output signals. Data interface 120 may also be for accessing the set of parameters 040 of the function. The set of parameters 040 trained by system 100 may be used to map an input instance to an output signal according to a method described herein, e.g., by system 200 of FIG. 2.

The processor subsystem 140 may be configured to, during operation of the system 100 and using the data interface 120, access data 030, 040. For example, as shown in FIG. 1, the data interface 120 may provide access 122 to an external data storage 021 which may comprise said data 030, 040. Alternatively, the data 030, 040 may be accessed from an internal data storage which is part of the system 100. Alternatively, the data 030, 040 may be received via a network from another entity, e.g., system 200 of FIG. 2. In general, the data interface 120 may take various forms, such as a network interface to a local or wide area network, e.g., the Internet, a storage interface to an internal or external data storage, etc. The data storage 021 may take any conventional and suitable form.

Processor subsystem 140 may be configured to, during operation of the system 100 and using the data interface 120, train the function.

To train the function, processor subsystem 140 may be configured to determining an output signal of the function for a training input instance from training dataset 030. To determine this output signal, processor subsystem 140 may be configured to identify a number of reference instances of the multiple reference instances as parent instances of the training input instance based on a similarity between the training input instance and the multiple reference instances determined according to a similarity function. To determine the output signal, processor subsystem 140 may be further configured to determine an aggregate latent representation for the training input instance based on aggregating representations and/or reference output signals of the identified parent instances using an aggregation function. To determine the output signal, processor subsystem 140 may be further configured to determine the output signal based on the aggregate latent representation for the training input using an output function.

To train the function, processor subsystem 140 may be further configured to derive a training signal by comparing the determined output signal for the training input instance to the training output signal for the training input instance. Processor subsystem 140 may further adjust at least a representation of a reference instance according to the training signal, obtaining a reference instance not comprised in the training dataset.

As an optional component, the system 100 may comprise an image input interface or any other type of input interface (not shown in this figure) for obtaining sensor data from one or more sensors, such as a camera. Some or all training input instances or output signals of training dataset 030 may be based at least in part on the obtained sensor data. For example, the camera may be configured to capture image data 124, processor subsystem 140 being configured to determine training input instances of training dataset 030 based on the image data 124 obtained, via data communication 123, from input interface 160. The input interface may be configured for various types of sensor signals, e.g., video signals, radar/LiDAR signals, ultrasonic signals, etc. Sensors are further discussed in FIG. 2.

Various details and aspects of the operation of the system 100 will be further elucidated with reference to FIGS. 4a, 4b, 5a, 5b, including optional aspects thereof.

In general, the system 100 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the system 100 may also be implemented in a distributed manner, e.g., involving different devices or apparatuses, such as distributed servers, e.g., in the form of cloud computing.

Figure 2:
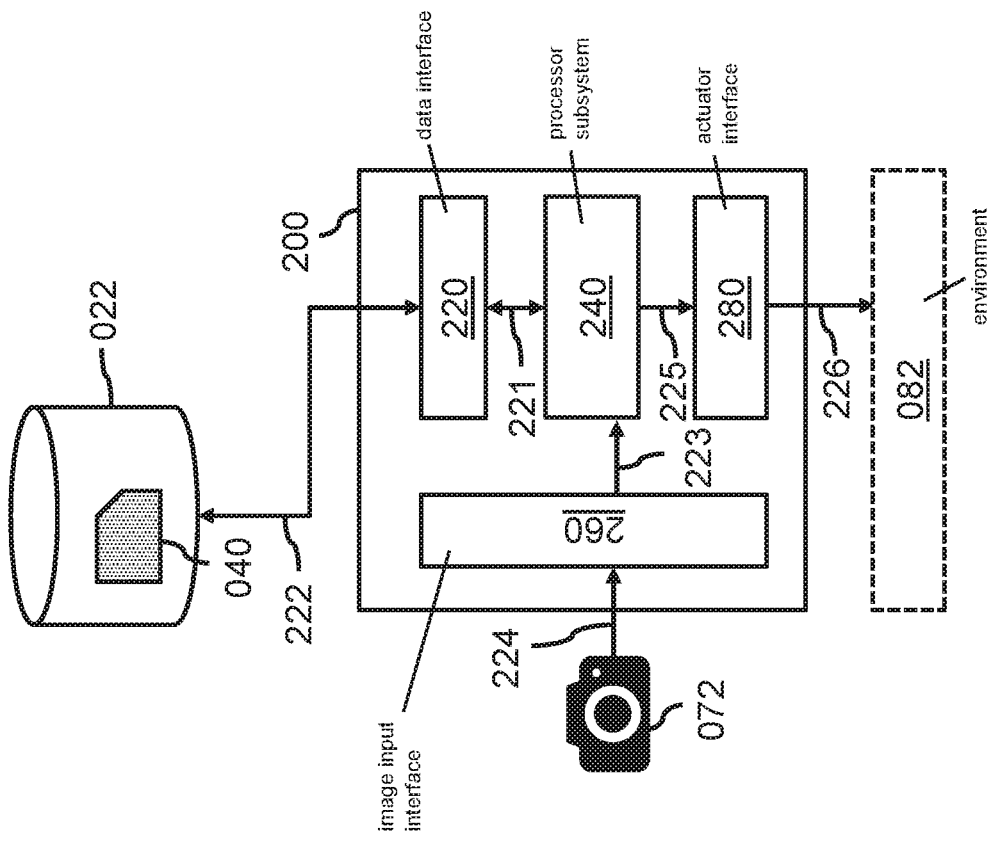
FIG. 2 shows a system for applying a function for controlling or monitoring a physical system operating in an environment, in accordance with an example embodiment of the present invention.

FIG. 2 shows a system 100 for applying a function for controlling or monitoring a physical system operating in an environment, in accordance with an example embodiment of the present invention. The function may map an input instance comprising one or more sensor measurements to an output signal for use in said controlling or monitoring. The function may be parameterized by a set of parameters. The set of parameters may include representations of multiple reference instances. The system 200 may comprise a data interface 220 and a processor subsystem 240 which may internally communicate via data communication 221. Data interface 220 may be for accessing the set of parameters 040 of the function. Set of parameters may be obtained according to a method described herein, e.g., by system 100 of FIG. 1. System 200 may perform the training itself, e.g., systems 100 and 200 may be combined into a single system.

The processor subsystem 240 may be configured to, during operation of the system 200 and using the data interface 220, access data 040. For example, as shown in FIG. 2, the data interface 220 may provide access 222 to an external data storage 022 which may comprise said data 040. Alternatively, the data 040 may be accessed from an internal data storage which is part of the system 200. Alternatively, the data 040 may be received via a network from another entity. In general, the data interface 220 may take various forms, such as a network interface to a local or wide area network, e.g., the Internet, a storage interface to an internal or external data storage, etc. The data storage 022 may take any conventional and suitable form.

Processor subsystem 240 may be configured to, during operation of the system 200 and using the data interface 220, obtain an input instance. For example, the input instance may be obtained via a sensor interface, as also discussed below. Processor subsystem 240 may be further configured to identify a number of reference instances of the multiple reference instances as parent instances of the input instance based on a similarity between the input instance and the multiple reference instances determined using a similarity function. Processor subsystem 240 may be further configured to determining an aggregate latent representation for the input instance based on aggregating data representing the identified parent instances using an aggregation function. Processor subsystem 240 may be further configured to determine the output signal based on the aggregate latent representation for the input instance using an output function. Processor subsystem 240 may be further configured to control or monitor the physical system based on the output signal, e.g., in ways that are conventional. Optionally, a representation of a reference instance may comprise a representation of the reference instance in a latent space of the similarity function. Optionally, determining the aggregate latent representation may comprise determining output signals of the function for the identified parent instances using the output function.

The system 200 may comprise an image input interface 260 or any other type of sensor interface for obtaining the one or more sensor measurements 224, the sensor measurements being from one or more sensors, such as a camera 072. In the following, for explanatory purposes, a single sensor is discussed. Processor subsystem 240 may be configured to determine the input instance to which the function is applied, from the sensor data 224. Generally, sensor data 224 represents one or more physical quantities of system 200 and/or an environment 082 with which the system interacts. For example, the camera may be configured to capture image data 224, processor subsystem 240 being configured to determine the input instance, e.g., by feature extraction, based on image data 224 obtained, via data communication 223, from input interface 260. The input interface may be configured for various types of sensor signals, e.g., video signals, radar/LiDAR signals, ultrasonic signals, etc. Sensor interface 260 may also access the sensor data from elsewhere, e.g., from a data storage or a network location. Sensor interface 260 may have any suitable form, including but not limited to a low-level communication interface, e.g., based on I2C or SPI data communication, but also a data storage interface such as a memory interface or a persistent storage interface, or a personal, local or wide area network interface such as a Bluetooth, Zigbee or Wi-Fi interface or an ethernet or fibreoptic interface. The sensor may be part of system 200.

As an optional component, the system 200 may comprise an actuator interface 280 for providing, to one or more actuators (not shown), actuator data 226 causing the one or more actuators to effect an action in environment 082 of system 200. Actuator interface 260 may internally communicate with processor subsystem 240 via data communication 225. For ease of explanation, below, a single actuator is discussed. For example, system 200 may be a component of an autonomous device, wherein processor subsystem is configured to determining control data for controlling the autonomous device based on the determined output signal. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. The actuator may be part of system 200.

Various details and aspects of the operation of the system 200 will be further elucidated with reference to FIGS. 4a, 4b, 5a, 5b, including optional aspects thereof.

In general, the system 200 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the system 200 may also be implemented in a distributed manner, e.g., involving different devices or apparatuses, such as distributed servers, e.g., in the form of cloud computing.

Figure 3:
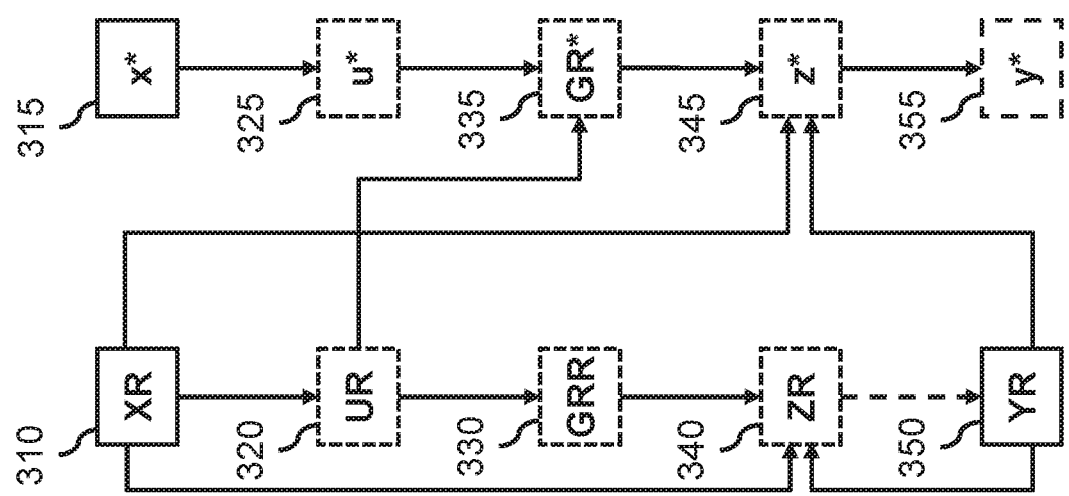
FIG. 3 shows a detailed example of a trainable function, in which reference instances are not adjusted according to a training signal during training, in accordance with an example embodiment of the present invention.

FIG. 3 shows a detailed example of a trainable function, in accordance with an example embodiment of the present invention. The function maps an input instance to an output signal. In this example, reference instances are not adjusted according to a training signal during training, e.g., they are selected randomly from the training dataset prior to training the function. This example is based on the techniques discussed in "The Functional Neural Process" by C. Louizos et al., and various implementation choices discussed in that paper can also be applied here. Many aspects explained with respect to this figure, also apply when reference instances are adjusted according to training signals, e.g., as in FIGS. 4a, 4b, 5a, 5b.

Shown in this figure is an input instance x*, 315. The goal of the function is to determine an output signal y*, 355, for input instance x*. Input instance x* is shown with a solid box to indicate that it is not determined by the function but obtained elsewhere, e.g. from another component of a system in which the function is applied. The dashing style of output signal y* indicates that it is determined as an output of the function. Typically, input instance x* comprises sensor data, in particular, an image. Input instance x* is typically multi-valued, e.g., comprising at least 10, at least 50, or at least 100 values.

In order to map input instance x* to output signal y*, the function in this example uses as additional inputs a set XR, 310, of reference instances, and a set YR, 350, of corresponding reference output signals. Reference instances XR and output signals YR are example inputs and output signals of the function, selected randomly from a training dataset. As indicated by the solid boxes of reference inputs XR and reference output YR, they are externally obtained. By taking into account information about reference inputs XR that are similar to input instance x*, a more accurate output signal y* can be obtained.

To compute output signal y* from input instance x* and reference inputs XR, YR, various intermediate values are computed, as indicated by the dashed boxes UR, 320; u*, 325; GRR, 330; GR*, 335; ZR, 340; and z*, 345. The intermediate values are typically computed using trainable functions whose parameters are trained based on a training dataset. The functions used to compute the intermediate values from the input, and to compute output signal y* from the intermediate values, can be stochastic functions in the sense that they output parameters of a probability distribution of their output values.

Specifically, in this example, from input instance x*, a latent representation u* is computed in a latent space, using a trainable representation function. From reference instances XR, similarly, latent representations UR are computed in that same latent space, using the same trainable representation function. This latent space may be referred to throughout as the "dependency space" because it which contains information about the dependency structure between various instances, as further explained below. Latent space representations are typically vectors, e.g., comprising at least 10 or at least 50 values. Mathematically, we may denote application of this trainable representation function as $p_\theta(u^*|x^*; \theta_u)$ and $p_\theta(U_R|X_R)=\Pi_i p_\theta(u_i|x_i; \theta_u)$, with $u^*$ denoting the latent space representation of input instance $x^*$; $u_i$ denoting the latent space representation of reference instance $x_i$; and $\theta_u$ denoting parameters of the trainable function used to compute the latent space representations, for example, a neural network. For example, the trainable representation function may compute a mean and variance of a Gaussian distribution, a value for a delta peak distribution, or other parameters of probability distributions for the latent space representations. For this representation, as for other trainable functions used throughout, any trainable function can be used that is appropriate for the type of input instances of the function. For example, various neural network architectures can be used such as a convolutional-type neural network, e.g., for images.

In functions according to this example, reference input instances are taken into account for input instance x* by making use of a dependency structure modelled by a directed acyclic graph (DAG) among the instances. Nodes of the graph represent instances and an edge from node i to node j indicates that node i is a parent instance of node j. This graph is a latent variable of the model on which inference is performed. The distribution over such graphs may be defined by letting the probability of two instances being connected be governed by their similarity on the latent space discussed above as measured, for example, by a kernel function. Parenthood may be restricted to the reference instances XR, e.g., the randomly selected subset of training instances. All other instances, e.g., input instance x* when using the model and training input instances when training the model, may be modelled to have reference instances as parents only. This graph is shown in the figure as a DAG GRR among reference input instances XR, and a bipartite directed graph GR* from reference instances to non-reference instances, e.g., the input instance x* when applying the model and the set of non-reference training instances when training the model.

Accordingly, when applying the model to an input instance x*, latent representations UR of the training instances and latent representation u* of the input instance may be compared. Thus, a number of reference instances of the reference instances UR may be identified as parent instances of the input instance, as denoted by bipartite directed graph GR* between XR and x*. Mathematically, graph GR* may be determined as $p_\theta(G_{R*}|u^*,U_R; \theta_l)$ where $\theta_l$ denote the parameters of the function used to compare latent space representations, if any. For example, edges can be present in the graph according to a Bernoulli distribution with probability depending on the similarity.

Various types of comparison may be performed depending on the particular type of input data. For example, for images, a distance measure, e.g., an L2 measure may be used. If the input data comprises other data then suitable other distance measure may be included. For example, in an embodiment the input data comprises sensor data of multiple sensors. For temperature, a temperature difference may be used, for pressure a pressure difference etc. However, temperature and pressure data may be appropriately scaled to take into account the different scales in which they occur in the modelled system. Multiple distance measures may be combined into a single distance, e.g., by a sum of squares, possibly weighted. The comparison may be performed using a kernel function. For example, a di-graphon kernel may be used, whose length-scale parameter can be included in set of parameters $\theta_l$. The inventors found that kernel $$g(u_i, u_j) = \exp\left(-\frac{\tau}{2}\|u_i - u_j\|^2\right)$$

works well.

Graph GRR may be determined as $p_\theta(G_{RR}|U_R;\theta_l)$ based on the same parameters. In the case of graph GRR, a first reference instance may be identified as a parent instance of a second reference instance only if the first instance precedes the second instance according to a topological ordering. This way, cycles in graph GRR may be avoided. For example, the topological ordering may be defined according to a parameter free scalar projection t(·) of u, e.g., $u_i > u_j$ when $t(u_i) > t(u_j)$. As an example, function t(·) may be defined as $t(u_i) = \Sigma_k t_k(u_{ik})$ where each individual $t_k(·)$ may be a monotonic function, e.g. the log CDF of a standard normal distribution. In this case, one can guarantee that $u_i > u_j$ when individually for all of the dimensions k one has that $u_{ik} > u_{jk}$ under $t_k(·)$. Mathematically, such a definition of graph GRR may be denoted:

$$p(G_{RR}|U_R) = \Pi_{i \in R}\Pi_{j \in R, j \neq i} \text{Bern}(G_{ij}|\Pi[t(u_i) > t(u_j)]g(u_i, u_j)).$$

The reference instances identified as parent instances in graph GR* may be taken into account in this example by determining an aggregate latent representation z*, 345, for input instance x* based on aggregating representations and/or reference output signals of the parent instances identified in graph GR* using an aggregation function. Mathematically, this may be denoted as $p_\theta(z^*|G_{R*},X_R,Y_R;\theta_z)$, with $\theta_z$ being trainable parameters of the aggregation function. As a concrete example, the aggregation function may map information about respective identified parent instances into respective latent representations of the parent instances, for instance, using one or more neural networks, and combine the respective latent representations with each other, e.g., as a sum or by using a trainable recurrent neural network unit. For example, respective components of z* may be computed by aggregating respective trainable subfunctions applied on the parents, e.g., using an independent Gaussian distribution per dimension k in the case of a stochastic function.

As a concrete example of aggregation function, the following may be used to determine a component 4 of aggregate latent representation z*:

$$p_\theta(z_k^*|G_{R*},X_R,Y_R) = \mathcal{N}(z_k^*|C_i\Sigma_{j \in R}A_j\mu_\theta(x_j^r,y_j^r)_k, \exp(C_i\Sigma_{j \in R}A_j\nu_\theta(x_j^r,y_j^r)_k))$$

where $A_j$ indicates which reference instances are parent instances of the input instance x*; $\mu_\theta(\cdot,\cdot)$ and $\nu_\theta(\cdot,\cdot)$ are vector valued functions, parametrized by respective parameters $\theta \subset \theta_z$, with a codomain in $\mathbb{R}^{|z|}$ that transform reference instances $x_j^r$ and reference output signals $y_j^r$. The $C_i$ may be a normalization constant with $C_i = (\Sigma_j A_{ij} + \epsilon)^{-1}$, e.g., it corresponds to the reciprocal of the number of parents of point i, with an extra small $\epsilon$ to avoid division by zero when a point has no parents. Similarly, aggregate latent representations ZR of reference instances XR may be obtained from the parent reference instances XR and their reference output signals YR according to the same aggregation function in accordance with graph GRR.

Based on aggregate latent representation z* of input instance x*, output signal y* of the trainable function may be determined using an output function, e.g., a neural network. For example, mathematically, $p_\theta(y^*|z^*;\theta_y)$, with $\theta_y$ being trainable parameters of the output function. Similarly to above, e.g., a single value for the output signal may be returned or parameters of a probability distribution, e.g., a mean and standard deviation of a univariate or multivariate Gaussian, etc. The output signal can also be vector-valued.

In various cases, a confidence value may be determined for output signal y*. For example, the returned standard deviation may provide such a confidence score for the output function, but typically multiple output signals are sampled to also take into account stochasticity of the similarity function and/or aggregation function. Based on such sampling, for example, multiple output probabilities for multiple labels may be determined. For example, if the inputs are road signs, a vector may be determined indicating a probability for each possible road sign that can be recognized by the model. If one particular output is confidently recognized, e.g., a particular road sign, one probability will be high and the rest low, e.g., close to zero. If no particular output is confidently recognized then many or all probabilities will be approximately the equal. Thus, the confidence in the output signal may be derived by measuring how close the output signal is from uniform: closer to uniform being less confident and further away from uniform being more confident. The confidence in the output signal may be reflected in a number in various ways; one way to do this is to compute the entropy of the generated probabilities.

Training typically comprises applying the function to training input instances, and deriving a training signal by comparing the determined output signal for the training input instance to the training output signal for the training input instance. Based on such a training signal, the parameters of the function, e.g., parameters $\theta_u$, $\theta_z$, $\theta_y$, $\theta_l$, can be learned.

In this particular example, since the reference instances XR come from the training dataset, also ground-truth reference output signals YR are available and can be compared with the result of applying the function to the reference instances, as indicated by the dashed line between aggregate latent representations ZR and reference output signals YR for the reference instances. Also based on this training signal, parameters $\theta_u$, $\theta_z$, $\theta_y$, $\theta_l$ can be refined. However, reference instances XR and ground-truth labels YR remain unchanged during the training.

As a concrete mathematical implementation, the following model may capture the relations between reference instances R and non-reference instances M together forming a training dataset D=R∪M:

$$p(Y_D | X_D) = p(Y_M, Y_R | X_M, X_R) =$$

$$\sum_{\substack{G_{RM} \\ G_{RR}}} \int p(Y_M, Y_R, Z_M, Z_R, G_{RM}, G_{RR}, U_M, U_R | X_M, X_R) d$$

$$Z_M dZ_R dU_M dU_R = \sum_{\substack{G_{RM} \\ G_{RR}}} \int p_\theta(Y_M | Z_M) p_\theta(Z_M | G_{RM}, X_R, Y_R)$$

$$p_\theta(G_{RM} | U_R, U_M) p_\theta(U_M | X_M) \prod_{i \in R} p_\theta(y_i | z_i) p_\theta(z_i | G_{Ri}, X_{par_i}, y_{par_i})$$

$$\overline{(*)}$$

$$p_\theta(G_{RR} | U_R) p_\theta(U_R | X_R) dZ_M dZ_R dU_M dU_R.$$

As can be seen, in this mathematical implementation, latent representation $z_i$ of a reference instance from ZR is conditioned on the in- and outputs of its parents $X_{par_i}, Y_{par_i}$. This does not introduce a circular dependency however because the dependency graph $G_{RD}=G_{RR}\cup G_{RM}$ is acyclic, as discussed. For root nodes under $G_{RD}$, the set of parents is empty. In such cases, the data-dependent prior in the above formula becomes data-independent. In particular, it can be observed that $$(*) = \prod_{i \in R_0} p_\theta(y_i | z_i) p_0(z_i) \cdot \prod_{i \in R \setminus R_0} p_\theta(y_i | z_i) p_\theta(z_i | G_{Ri}, X_{par_i}, Y_{par_i})$$

where $R_0 \in R$ denotes the root nodes of R under and $p_0$ is a prior, e.g., a modelled as a standard Gaussian. It is noted that in this example, (*) can be evaluated in parallel for all points, but sampling has to be done sequentially according to the DAG ordering.

Figure 4B:
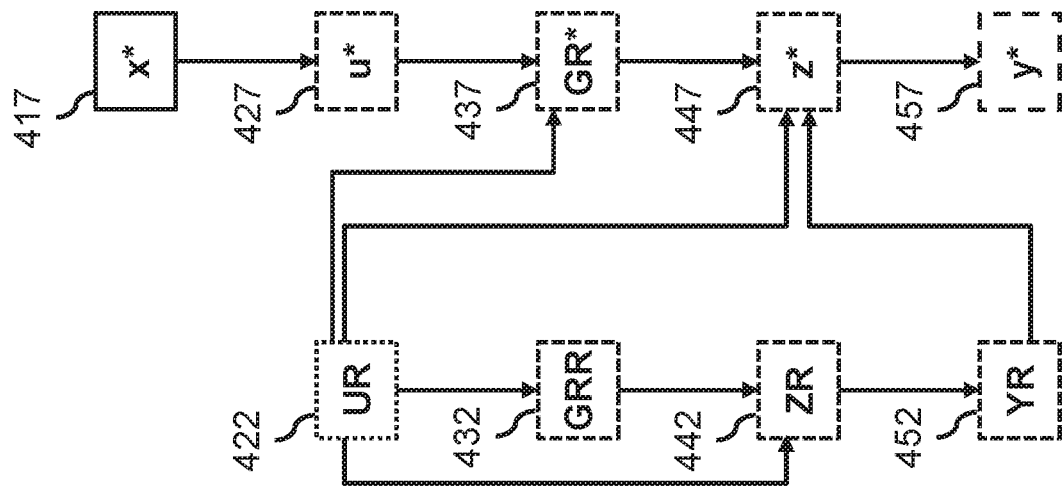
FIG. 4b shows a detailed example of a trainable function, in which latent representations of reference instances are comprised in the set of trained parameters, and reference output signals are computed, in accordance with an example embodiment of the present invention.
Figure 4A:
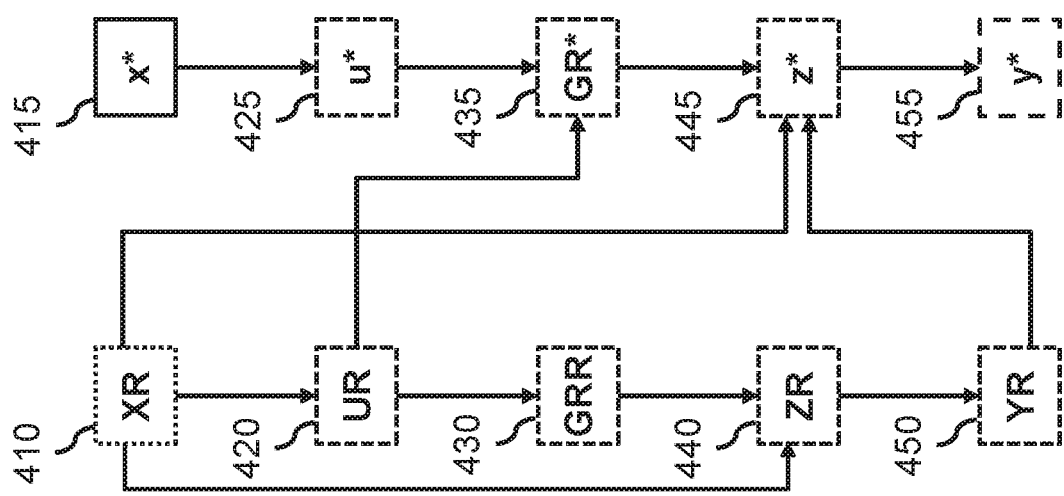
FIG. 4a shows a detailed example of a trainable function, in which reference instances are comprised in the set of trained parameters, and reference output signals are computed, in accordance with an example embodiment of the present invention.

FIG. 4a shows another detailed example of a trainable function mapping an input instance to an output signal, in accordance with an example embodiment of the present invention. This example is based on FIG. 3 and many implementation choices of FIG. 3 also apply here. Unlike in FIG. 3, however, in this example, reference instances XR are parameters of the function that are refined during training. Reference instances XR may be initialized based on a training dataset, but still, due to the refinement, after the training, the reference instances are typically not anymore instances from the training dataset, but synthetic instances trained to optimally map input instances to output signals.

In this example, reference output signals YR, 450 are not parameters of the function, as discussed in more detail later. It is also possible to have the reference output signals be parameters of the function, but the inventors realized that computing them instead has several advantages. One is smaller size due to a reduced number of parameters. In the stochastic setting, computing reference output signals as needed allow to capture their uncertainty, e.g., to sample according to their variability, and can reduce risk of overfitting.

In this example, similarly to FIG. 3, an input instance x*, 415, is mapped to an output signal y*, 455, possibly stochastically. For this, use is made of a set of reference instances XR, 410. Interestingly, in this example the reference instances are trainable parameters of the function. Also shown are reference output signals YR, 450, corresponding to the reference inputs. In this example, as explained below, these reference output signals are not comprised in the set of parameters of the trainable function but instead they are determined as needed.

Output signal y* for input instance x* is determined as follows. A number of reference instances of the multiple reference instances XR are identified as parent instances of the training input instance based on a similarity between the training input instance and the multiple reference instances determined according to a similarity function. In this example, similarly to FIG. 3, similarity between input instance x* and reference instances XR is determined by determining a latent representation u*, 425, of x* in a latent space according to a trainable function and comparing this latent representation u* to latent space representations UR, 420, of the reference instances. The parent instances are represented here as a graph GR*, 435, with edges between the identified parent instances and the input instance.

Based on the identified parent instances, an aggregate latent representation z*, 445, for the input instance x* may be determined based on aggregating the parent instances XR and/or the corresponding reference output signals YR, similarly to FIG. 3. Based on the aggregate latent representation z*, output signal y* of the function may be determined using an output function, e.g., as described for FIG. 3. When performing the aggregation, it is not absolutely needed to include reference output signals YR; however, including YR usually facilitates learning, since YR is a representation of the parent instance in the same format that is supposed to be determined for input instance x*. However, since the reference output signals YR of the identified parent instances are not included in the parameters of the trainable function, they need to be determined.

Mathematically speaking, the determination of the reference output signals YR may be denoted as $\Pi_{i \in R} p_\theta(y_i|z_i)$. In the stochastic session, for example, reference output signals may be determined from respective aggregate latent representations $z_i$ in the form of parameters of a probability distribution. For example, the parameters may be a mean and variance of a Gaussian distribution, e.g., for regression tasks, or probabilities of a categorical distribution, e.g., for classification tasks. For example, the probabilities of the categorical distribution may be determined as a softmaxed transformation of the aggregate latent representation $z_i$. The reference output signals may be determined from their aggregate latent representations using the same output function that is also used to determine output signal y* from its aggregate latent representation z*.

Accordingly, the reference output signals YR may be treated as latent variables over which inference may be performed, as opposed to output values that the model should aim to recover. For example, the function may be described mathematically by the following marginal likelihood with respect to training dataset $X_D, Y_D$:

$$p(Y_D | X_D, X_R) =$$

$$\sum_{G_{RD} \atop G_{RR}} \int p(Y_D, Y_R, Z_D, Z_R, G_{RD}, G_{RR}, U_D, U_R | X_D, X_R) dZ_D dZ_R$$

$$dU_D dU_R dY_R = \sum_{G_{RD} \atop G_{RR}} \int p(Y_D, Z_D, G_{RD}, U_D | X_D, U_R, X_R, Y_R)$$

$$p(Y_R, Z_R, G_{RR}, U_R | X_R) dZ_D dZ_R dU_D dU_R dY_R =$$

$$\sum_{G_{RD} \atop G_{RR}} \int p_\theta(Y_D | Z_D) p_\theta(Z_D | G_{RD}, X_R, Y_R) p_\theta(G_{RD} | U_R, U_D)$$

$$p_\theta(U_D | X_D) \prod_{i \in R} p_\theta(y_i | z_i) p_\theta(z_i | G_{Ri}, X_{par_i}, Y_{par_i})$$

$$p_\theta(G_{RR} | U_R) p_\theta(U_R | X_R) dZ_D dZ_R dU_D dU_R dY_R$$

In various embodiments, to improve tractability, a variational approximation to the above model is applied. In particular, when determining an aggregate latent representation for a parent instance P of input instance x*, interestingly, this aggregate representation may be based on representations of the parent instances of P themselves, but not on reference output signals YR of the parents of P. This type of approximation is particularly beneficial since it can yield a structured posterior approximation while still allowing for parallel sampling, in contrast to the sequential procedure for the prior.

For example, in the variational approximation, a latent representation ZR of a reference instance may be based on the reference instance itself (or a latent representation from UR used to determine similarity), and its parent instances, e.g.:

$$p_\theta(Z_D, U_D, G_{RD}, Y_R, Z_R, G_{RR}, U_R | X_R, X_D, Y_D) \approx$$

$$q_\phi(Z_D, U_D, G_{RD}, Y_R, Z_R, G_{RR}, U_R | X_R, X_D) =$$

$$q_\phi(Z_D, U_D, G_{RD} | U_R, X_R, X_D) q_\phi(Y_R, Z_R, G_{RR}, U_R | X_R) =$$

$$q_\phi(Z_D | X_D, G_{RD}, \bar{X}_R) p_\theta(G_{RD} | U_R, U_D) p_\theta(U_D | X_D)$$

$$\prod_{i \in R} p_\theta(y_i | z_i) q_\phi(z_i | x_i, G_{Ri}, X_{par_i}) p_\theta(G_{RR} | U_R) p_\theta(U_R | \bar{X}_R).$$

Here, the same factorization as above may be used, and weights may be shared between the model and approximation for all terms except for the Z-terms.

Various other approximations are possible as well. For example, a mean-field approximation, e.g., $q_\phi(z_i|x_i)$ may be applied, which also allows parallel sampling but is no longer structured. Another option is a structured mean-field approximation, e.g., $q_\phi(z_i|x_i, G_{Ri}, X_R, Y_R)$, which is more structured but may use sequential sampling. Another possibility is a structured mean-field approximation using the output signals of the parents for training input instances but not for reference instances, e.g., $q_\phi(Z_D, U_D, G_{RD}|U_R, Y_R, X_R, X_D)$ This way, output signals for reference input instances can be sampled in parallel, and training input instances can be sampled in parallel given the output signals of the reference input instances. It is also possible to approximate $p_\theta(y_i|z_i)$ by a $q_\phi(y_i|z_i)$.

When training the function on a training dataset, output signals for training instances determined according to the above model may be compared to training output signals, thus obtaining a training signal that can be used to adjust some or all of the trainable parameters. For example, determining the training signal can comprise evaluating an ELBO (Evidence Lower Bound) loss on the training dataset, based on which parameters of the function may be updated to decrease the loss, for instance, by mini-batch gradient descent. For example, an ELBO resulting from the above variational approximation may be:

$$\mathcal{L}(\theta, \phi) = \mathbb{E}_{\substack{q_\phi(Z_D, U_D, G_{RD}|Y_R, U_R, X_D) \\ q_\phi(Y_R, Z_R, G_{RR}, U_R|X_R)}} \left[ \log \frac{p_\theta(Y_D | Z_D) p_\theta(Z_D | G_{RD}, X_R, Y_R) p_\theta(G_{RD} | U_R, U_D) p_\theta(U_D | X_D)}{q_\phi(Z_D | X_D, G_{RD}, \bar{X}_R) p_\theta(G_{RD} | U_R, U_D) p_\theta(U_D | X_D)} \cdot \frac{\prod_{i \in R} p_\theta(y_i | z_i) p_\theta(z_i | G_{Ri}, X_{par_i}, X_{par_i}) p_\theta(G_{RR} | U_R) p_\theta(U_R | \bar{X}_R)}{\prod_{i \in R} p_\theta(y_i | z_i) q_\phi(z_i | x_i, G_{Ri}, \bar{X}_{par_i}) p_\theta(G_{RR} | U_R) p_\theta(U_R | \bar{X}_R)} \right] =$$

$$\mathbb{E}_{\substack{q_\phi(Z_D, U_D, G_{RD}|Y_R, U_R, X_D) \\ q_\phi(Y_R, Z_R, G_{RR}, U_R|X_R)}} \left[ \log \frac{p_\theta(Y_D | Z_D) p_\theta(Z_D | G_{RD}, X_R, Y_R) \prod_{i \in R} p_\theta(z_i | G_{Ri}, X_{par_i}, Y_{par_i})}{q_\phi(Z_D | X_D, G_{RD}, \bar{X}_R) q_\theta(z_i | x_i, G_{Ri}, X_{par_i})} \right]$$

In particular, it is noted that evaluation of the above ELBO comprises sampling from the posterior and evaluation of the prior at the sampled point. Interestingly, both of these may be parallelized. Only sampling from the prior may have be performed sequentially.

Training based on a training signal, such as the above ELBO, typically proceeds in an iterative fashion, for example, in at least five, at least ten, or at least 100 iterations. In an iteration, some or all parameters of the function may be adjusted according to the training signal. For example, in an iteration, the reference instances XR may be adjusted along with the parameters of the similarity function and/or the aggregation function and/or the output function. Although typically the same loss is used to update the reference instances and the other parameters, it is not necessary for them to be updated in the same iteration. For example, in various embodiments an alternating learning schedule is used wherein, in one or more first iterations, representations XR are adjusted, and in one or more other second iterations interleaved with the first iterations, other parameters of the trainable function are adjusted. Also the learning rates of the representations XR may differ from the learning rates for other parameters.

At the start of training, the reference instances XR may be initialized in various ways, for example, randomly. Interestingly, it is also possible to aid learning by initializing the reference instances XR based on the training dataset. In an embodiment, the reference instances are initialized as a random subset of the training dataset. In an embodiment, initializing the reference instances comprises applying a clustering algorithm to some or all training instances, e.g., k-means, and using the resulting cluster centres as initial reference instances. It is also possible to use k-medoids instead of k-means, for example. In an embodiment, the initial reference instances may be sample from a determinantal point process (DPP) or a k-DPP. For example, a kernel may be used in the DPP or k-DPP with features defined in the space of the latent representation UR used to determine similarity. The number of reference instances is usually predetermined, but this is not necessary, e.g., in the DPP or k-DPP case, the number of reference instances may be random.

When applying the function, as a concrete example, the following posterior predictive distribution may be used to determine output signal y*:

$$p_\theta(y^* \mid x^*, X_R, X_D, Y_D) =$$

$$\sum_{\substack{G_{R^*} \\ G_{RR}}} \int p_\theta(y^*, z^*, G_{R^*}, u^*, Y_R, Z_R, G_{RR}, U_R \mid x^*, X_R, X_D, Y_D)$$

$$dz^* du^* dZ_R dU_R dY_R \approx$$

$$\sum_{\substack{G_{R^*} \\ G_{RR}}} \int p_\theta(y^* \mid z^*) p_\theta(z^* \mid G_{R^*}, X_R, Y_R) p_\theta(G_{R^*} \mid u^*, U_R) p_\theta(u^* \mid x^*) \prod_{i \in R} p_\theta(y_i \mid z_i) q_\phi(z_i \mid x_i, G_{Ri}, X_{par_i}) p_\theta(G_{RR} \mid U_R) p_\theta(U_R \mid X_R) dz^* du^* dZ_R dU_R dY_R$$

In this example, for performance reasons, variational approximation $q_\phi$ is applied to terms relating to the reference instances XR for performance reasons. This is not needed, however. Moreover, the variational approximation can also be applied to the terms relating to the input instance, but since this is just a single instance, the expected performance improvement of applying the approximation is smaller, so in the above example this is not done. As can be seen from the above formula, typically, the predictive distribution does not depend on the training instances $X_D, Y_D$. Effectively, the input instance is here assumed to be conditionally i.i.d. from the training data given reference instances and output signals $X_R, Y_R$.

FIG. 4b shows another detailed example of a trainable function mapping an input instance to an output signal, in accordance with an example embodiment of the present invention. This example is based on the example of FIG. 4a, and most of the options discussed there also apply here. A difference with FIG. 4a however is that reference instances are represented in the set of parameters of the trainable function not by including the reference instances themselves, but by including latent space representations UR, 422, of reference instances in the latent space of the similarity function. As the inventors realized, the latent representations are much smaller yet still contain sufficient information to evaluate the trainable function. This may lead to performance improvements not only during use, but also during training: the number of parameters that needs to be learned may be smaller, improving training speed and reducing the risk of over-fitting.

Instead of training the function to determine reference instances, the function may be trained to determine the latent space representations UR. In various embodiments, the reference instances themselves are never explicitly determined during training or use of the function. In fact, the latent representations do not even necessarily need to encode possible input instances, e.g., it is possible that for a given latent space representation in UR, no input instance exists that maps to this latent representation. In this example, the latent space representations UR are in the space that the similarity function is applied on, but also this is not necessary, e.g., the latent space representations could be in an intermediate latent space of the mapping from the instances to the latent space representations used to determine similarity.

For example, similarly to FIG. 4a, an input instance x*, 417, may be mapped to an output signal y*, 457. To this, a number of reference instances GR*, 437, of the multiple reference instances may be identified as parent instances of the input instance x* based on a similarity between the training input instance and the multiple reference instances determined according to a similarity function.

In this example, in order to determine the similarity, a latent representation u*, 427, of input instance x* in a latent space may be determined, and compared to the latent space representations UR, 422 of the reference instances. In this example, the latent representations UR of the reference instances are not determined form reference instances but instead directly included as parameters of the trained function.

Having identified parent instances GR*, an aggregate latent representation z*, 447, for the input instance x* may be determined based on aggregating representations and/or reference output signals of the identified parent instances using an aggregation function. The representations of the identified parent instances that are aggregated may be the latent representations UR, which are optionally combined with reference output signals YR, 452, e.g., determined for the parent instances using respective aggregate latent representations ZR, 442, of parents of the parents, as indicated by a directed acyclic graph GRR, 432. This can be similar to what was described for FIG. 4a, except that latent representations UR of the reference instances are used when the example of FIG. 4a uses reference instances XR. Based on aggregate latent representation z* of input instance x*, output signal y* may be determined using an output function.

For example, the function may be described mathematically as follows:

$$p(Y_D \mid X_D, U_R) =$$

$$\sum_{\substack{G_{RD} \\ G_{RR}}} \int p(Y_D, Y_R, Z_D, Z_R, G_{RD}, G_{RR}, U_D \mid X_D, U_R) dZ_D dZ_R dU_D dY_R =$$

$$\sum_{\substack{G_{RD} \\ G_{RR}}} \int p_\theta(Y_D \mid Z_D) p_\theta(Z_D \mid G_{RD}, U_R, Y_R) p_\theta(G_{RD} \mid U_R, U_D) p_\theta(U_D \mid X_D)$$

$$\prod_{i \in R} p_\theta(y_i \mid z_i) p_\theta(z_i \mid G_{Ri}, U_{par_i}, Y_{par_i}) p_\theta(G_{RR} \mid U_R) dZ_D dZ_R dU_D dY_R$$

As in FIG. 4a, in various embodiments, an approximation of the posterior may be applied to improve computational tractability. An example of such an approximation using latent representations as parameters is:

$$p_\theta(Z_D, U_D, G_{RD}, Y_R, Z_R, G_{RR} \mid U_R, X_D, Y_D) \approx$$

$$q_\phi(Z_D, U_D, G_{RD}, Y_R, Z_R, G_{RR} \mid U_R, X_D) =$$

$$q_\phi(Z_D, U_D, G_{RD} \mid U_R, X_D) q_\phi(Y_R, Z_R, G_{RR} \mid U_R) =$$

$$q_\phi(Z_D \mid X_D, G_{RD}, U_R) p_\theta(G_{RD} \mid U_R, U_D) p_\theta(U_D \mid X_D)$$

$$\prod_{i \in R} p_\theta(y_i \mid z_i) q_\phi(z_i \mid x_i, G_{Ri}, U_{par_i}) p_\theta(G_{RR} \mid U_R).$$

In this case, the evidence lower bound to be optimized during training may be:

$$\mathcal{L}(\theta, \phi) = \mathbb{E}_{\substack{q_\phi(Z_D, U_D, G_{RD} \mid Y_R, U_R, X_D) \\ q_\phi(Y_R, Z_R, G_{RR} \mid U_R)}}$$

$$\left[ \log \frac{p_\theta(Y_D \mid Z_D) p_\theta(Z_D \mid G_{RD}, U_R, Y_R) \prod_{i \in R} p_\theta(z_i \mid G_{Ri}, U_{par_i}, Y_{par_i})}{q_\phi(Z_D \mid X_D, G_{RD}, U_R) q_\phi(z_i \mid x_i, G_{Ri}, U_{par_i})} \right].$$

Also the posterior predictive distribution can be adapted accordingly. As discussed earlier, various ways of approximating the posterior are possible and can be applied here.

In various embodiments, reference instances are represented in the set of parameters as parameters of probability distributions $p(U_R)$ for sampling their latent space representations, e.g., $\{\mu_i, \sigma_i^2\}_{i=1, \ldots, R}$ for Gaussian $p(u_i) = \mathcal{N}(u_i \mid \mu_i, \sigma_i^2)$. As discussed above, to avoid cycles when determining graph GRR, a partial ordering of latent representations UR may be employed. As the inventors realized, in the stochastic case, if the latent representations are fixed as parameters, then so is the partial ordering, decreasing the amount of stochasticity in generating graphs GRR. By parametrizing the latent space representations as parameters of a probability distribution, stochasticity can be increased to avoid fixing the partial ordering of reference instances.

Figure 5B:
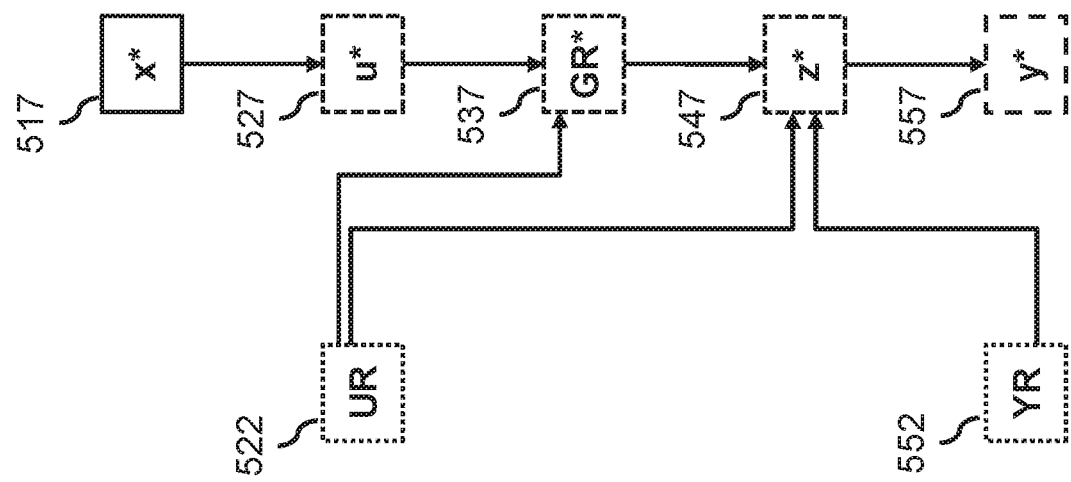
FIG. 5b shows a detailed example of a trainable function, in which latent representations of reference instances are comprised in the set of trained parameters, in accordance with an example embodiment of the present invention.
Figure 5A:
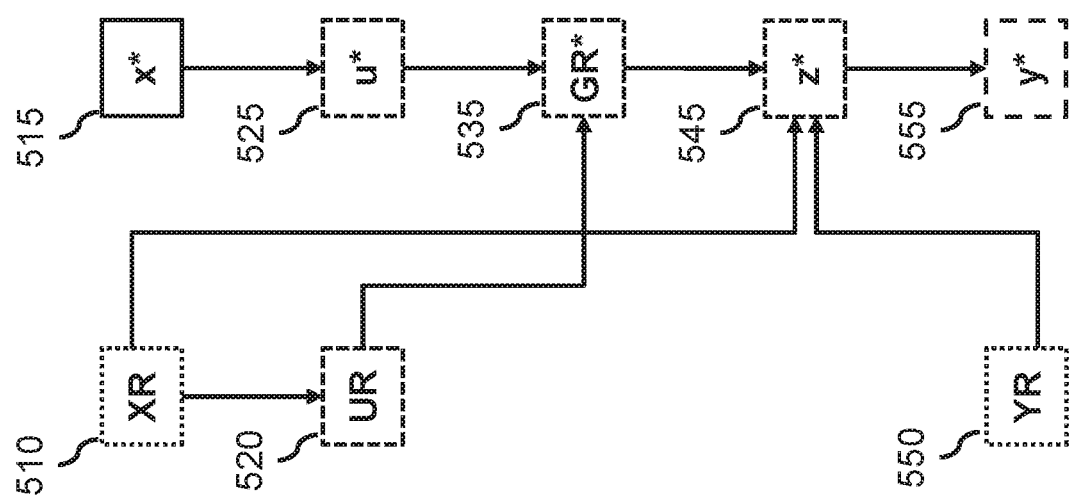
FIG. 5a shows a detailed example of a trainable function, in which reference instances and reference output signals are comprised in the set of trained parameters, in accordance with an example embodiment of the present invention

FIG. 5a shows a further detailed example of a trainable function mapping an input instance to an output signal, in accordance with an example embodiment of the present invention. This example is again based on the example of FIG. 4a, with the difference that not only reference instances XR, 510, but also reference output signals YR, 550, are comprised in the set of learned parameters of the function. Although computing the reference output signals can be advantageous in many settings as discussed above, including the reference output signals YR can also help in certain situations by providing a model that is easier and more efficient to evaluate. For example, determining parent-child relations among reference instances may no longer be needed.

In this example, output signal y*, 555, for input instance x*, 515 is determined. Similarly to FIG. 4a and elsewhere, a number of reference instances of the multiple reference instances XR may be identified as parent instances of the input instance x*, as indicated by graph GR*, 535, based on a similarity between the training input instance and the multiple reference instances determined according to a similarity function. Specifically, as shown in the figure, a representation u*, 525, of input instance x* in a latent space may be determined and compared to representations UR, 520, of the reference instances in the latent space.

Also in this case, an aggregate latent representation z*, 545, for the input instance x* may be determined based on aggregating representations XR and/or reference output signals YR of the identified parent instances using an aggregation function, as was done in FIG. 4a. Output signal y* may be determined based on the aggregate latent representation z*.

In this case, however, since the reference output signals YR are comprised in the set of parameters, they do not need to be computed to determine y*. Instead, the reference output signals YR are comprised in the set of parameters and accordingly may be adjusted according to a training signal based on comparing output signals y* for training input instances to training output signals. In particular, it may also not be needed during training to determine reference output signals YR from reference instances XR. Reference output signals YR can be determined to maximize the accuracy of the function to be learned, and not necessarily to best match the output of the function on the reference instances XR.

As an illustration, the following marginal likelihood can be used here:

$$p_\theta(Y_D \mid X_D, X_R, Y_R) =$$

$$\sum_{G_{RD}} \int p(Y_D \mid Z_D) p(Z_D \mid X_D, G_{RD}, X_R, Y_R) p(G_{RD} \mid U_D, U_R)$$

$$p(U_D \mid X_D) p(U_R \mid X_R) dZ_D dU_D dU_R$$

A further variant is shown in FIG. 5b. This variant is similar to that of FIG. 5a, but here, instead of the reference instances themselves, the latent representations UR, 522, of the reference instances in the latent space of the similarity function are comprised in the set of parameters. Otherwise, this variant can work in the same way as the variant of FIG. 5a: given an input instance x*, 517, a number of reference instances may be identified as parent instances, as indicated by graph GR*, 537, based on a latent representation u*, 527, of the input instance x* in the latent space also used for latent representations UR. Based on the identified parent instances, an aggregate latent representation z*, 547 may be determined, based on which output signal y*, 557, can be determined.

In this case, however, the latent representations UR are aggregated instead of the reference instances themselves, possibly along with reference output signals YR, 552. As in FIG. 4b, advantages include better performance and reduced risk of over-fitting. In this case, for example, the following marginal likelihood can be used:

$$p_\theta(Y_D \mid X_D, U_R, Y_R) = \sum_{G_{RD}} \int p(Y_D \mid Z_D)$$

$$p(Z_D \mid X_D, G_{RD}, X_R, Y_R)p(G_{RD} \mid U_D, U_R)p(U_D \mid X_D)dZ_D dU_D$$

FIG. 6 shows a block-diagram of computer-implemented method 600 of training a function for use in controlling or monitoring a physical system operating in an environment, in accordance with an example embodiment of the present invention. The function may map an input instance comprising one or more sensor measurements to an output signal for use in said controlling or monitoring. The function may be parameterized by a set of parameters. The set of parameters may include representations of multiple reference instances. The method 600 may correspond to an operation of the system 100 of FIG. 1. However, this is not a limitation, in that the method 600 may also be performed using another system, apparatus or device.

The method 600 may comprise, in an operation titled "ACCESSING TRAINING DATASET", accessing 610 a training dataset for training the function. The training dataset may comprise multiple training input instances and corresponding training output signals.

The method 600 may comprise training the function, for example, by iteratively performing steps 620-640 discussed below in one or more iterations.

To train the function, method 600 may comprise, in an operation titled "DETERMINING OUTPUT", determining 620 an output signal of the function for a training input instance. To determine the output signal, method 600 may comprise, in an operation titled "IDENTIFYING PARENTS", identifying 622 a number of reference instances of the multiple reference instances as parent instances of the training input instance based on a similarity between the training input instance and the multiple reference instances determined according to a similarity function. To determine the output signal, method 600 may further comprise, in an operation titled "AGGREGATING PARENT INFO", determining 624 an aggregate latent representation for the training input instance based on aggregating representations and/or reference output signals of the identified parent instances using an aggregation function. To determine the output signal, method 600 may further comprise, in an operation titled "DETERMINING OUTPUT BASED ON AGGREGATE", determining 626 the output signal based on the aggregate latent representation for the training input using an output function.

To train the function, method 600 may further comprise, in an operation titled "DERIVING TRAINING SIGNAL", deriving 630 a training signal by comparing the determined output signal for the training input instance to the training output signal for the training input instance. To train the function, method 600 may further comprise, in an operation titled "ADJUSTING REFERENCE INSTANCE", adjusting 640 at least a representation of a reference instance according to the training signal, obtaining a reference instance not comprised in the training dataset.

FIG. 7 shows a block-diagram of computer-implemented method 700 of applying a function controlling or monitoring a physical system operating in an environment. The function may map an input instance comprising one or more sensor measurements to an output signal for use in said controlling or monitoring. The function may be parameterized by a set of parameters. The set of parameters may include representations of multiple reference instances. The method 700 may correspond to an operation of the system 200 of FIG. 2. However, this is not a limitation, in that the method 700 may also be performed using another system, apparatus or device.

The method 700 may comprise, in an operation titled "ACCESSING PARAMETERS", accessing 710 the set of parameters of the function. The method 700 may comprise, in an operation titled "OBTAINING INPUT INSTANCE", obtaining 720 the input instance. The obtaining may comprise obtaining the one or more sensor measurements, the sensor measurements being of one or more sensors. The method 700 may comprise, in an operation titled "IDENTIFYING PARENTS", identifying 730 a number of reference instances of the multiple reference instances as parent instances of the input instance based on a similarity between the input instance and the multiple reference instances determined using a similarity function.

The method 700 may comprise, in an operation titled "AGGREGATING PARENT INFO", determining 740 an aggregate latent representation for the input instance based on aggregating data representing the identified parent instances using an aggregation function. The method 700 may comprise, in an operation titled "DETERMINING OUTPUT BASED ON AGGREGATE", determining 750 the output signal based on the aggregate latent representation for the input instance using an output function. The method 700 may comprise, in an operation titled "CONTROLLING PHYSICAL SYSTEM", controlling 760 the physical system based on the output signal, and/or, in an operation titled "MONITORING PHYSICAL SYSTEM", monitoring 770 the physical system based on the output signal.

Here, a representation of a reference instance comprises a representation of the reference instance in a latent space of the similarity function and/or determining the aggregate latent representation comprises determining output signals of the function for the identified parent instances using the output function.

Methods 600 and 700 may be combined, e.g., method 700 may determine the parameters of the function according to method 600 prior to accessing them for applying them to an input instance.

It will be appreciated that, in general, the operations of method 600 of FIG. 6 and method 700 of FIG. 7 may be performed in any suitable order, e.g., consecutively, simultaneously, or a combination thereof, subject to, where applicable, a particular order being necessitated, e.g., by input/output relations.

The method(s) may be implemented on a computer as a computer implemented method, as dedicated hardware, or as a combination of both. As also illustrated in FIG. 8, instructions for the computer, e.g., executable code, may be stored on a computer readable medium 800, e.g., in the form of a series 810 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 8 shows an optical disc 800. Alternatively, the computer readable medium 800 may comprise transitory or non-transitory data 810 representing a set of parameters of a function mapping an input instance to an output signal for use in a computer-implemented method as described herein, the set of parameters including representations of multiple reference instances, wherein a representation of a reference instance comprises a representation of the reference instance in a latent space of a similarity function and/or a representation of a reference instance does not comprise a reference output signal of the function for the reference instance.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated herein. The article "a" or "an" preceding an element does not exclude the presence of a plurality of such elements.

Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented using hardware comprising several distinct elements, and using a suitably programmed computer. For a device for which several elements are enumerated, several of these elements may be embodied by one and the same item of hardware. The mere fact that certain measures are described mutually separately does not indicate that a combination of these measures cannot be used to advantage.

What is claimed is:

1. A computer-implemented method of training a function for use in controlling an autonomous or semiautonomous vehicle operating in an environment, the function mapping an input instance including one or more sensor measurements to an output signal for use in the controlling, the function being parameterized by a set of parameters, the set of parameters including representations of multiple reference instances, the method comprising the following steps:
    accessing a training dataset for training the function, the training dataset including multiple training input instances and corresponding training output signals;
    training the function by:
        determining an output signal of the function for a training input instance of the training input instances, including:
            identifying a number of reference instances of the multiple reference instances as parent instances of the training input instance based on a similarity between the training input instance and the multiple reference instances determined according to a similarity function,
            determining an aggregate latent representation for the training input instance based on aggregating representations or reference output signals of the identified parent instances using an aggregation function, and
            determining the output signal based on the aggregate latent representation for the training input instance using an output function;
        deriving a training signal by comparing the determined output signal for the training input instance to the corresponding training output signal for the training input instance;
        adjusting at least a representation of a reference instance of the reference instances according to the training signal to obtain a reference instance not included in the training dataset; and
        determining a confidence value of the function for the input instance based on (i) sampling multiple output signals or (ii) determining a probability distribution of the output signal;
    wherein the autonomous or semi-autonomous vehicle is controlled based on the output signal and the confidence value.

2. The method according to claim 1, wherein the determining of the output signal of the function for the training input instance includes determining a reference output signal of the function for an identified parent instance of the parent instances.

3. The method according to claim 2, wherein the determining the reference output signal of the function for the identified parent instance includes determining an aggregate latent representation for the identified parent instance, the aggregated latent representation being computed based on aggregating the representations of identified parent instances of the identified parent instance using an aggregation function.

4. The method according to claim 1, wherein a representation of a reference instance includes the reference instance or a representation of the reference instance, in a latent space of the similarity function.

5. The method according to claim 1, further comprising:
    determining a similarity between the training input instance and a reference instance of the reference instances by determining a latent representation of the training input instance in a latent space according to a trainable function and comparing the latent representation to a representation of the reference instance in the latent space.

6. The method according to claim 1, wherein the similarity function or the aggregation function or the output function are stochastic functions configured to output parameters of a probability distribution.

7. The method according to claim 1, further comprising:
    initializing the representations of the multiple reference instances based on the training dataset.

8. The method according to claim 1, wherein the set of parameters further includes parameters of the similarity function or the aggregation function or the output function, the training further including adjusting the parameters of the similarity function or the aggregation function or the output function according to a training signal.

9. The method according to claim 1, wherein the training input instance includes an image.

10. A computer-implemented method of applying a function for controlling an autonomous or semiautonomous vehicle operating in an environment, the function mapping an input instance including one or more sensor measurements to an output signal for use in the controlling, the function being parameterized by a set of parameters, the set of parameters including representations of multiple reference instances, the method comprising the following steps:
    accessing the set of parameters of the function;
    obtaining the input instance, including obtaining the one or more sensor measurements, the sensor measurements being of one or more sensors;
    identifying a number of reference instances of the multiple reference instances as parent instances of the input instance based on a similarity between the input instance and the multiple reference instances determined using a similarity function;

determining an aggregate latent representation for the input instance based on aggregating data representing the identified parent instances using an aggregation function;

determining the output signal based on the aggregate latent representation for the input instance using an output function;

determining a confidence value of the function for the input instance based on 1 sampling multiple output signals or (ii) determining a probability distribution of the output signal; and controlling the autonomous or semi-autonomous vehicle based on the output signal and the confidence value;

wherein a representation of a reference instance of the reference instances includes a representation of the reference instance in a latent space of the similarity function or determining the aggregate latent representation includes determining output signals of the function for the identified parent instances using the output function.

11. A system for training a function for use in controlling an autonomous or semiautonomous vehicle operating in an environment, the function mapping an input instance including one or more sensor measurements to an output signal for use in the controlling, the function being parameterized by a set of parameters, the set of parameters including representations of multiple reference instances, the system comprising:

a data interface configured to access a training dataset for training the function, the training dataset including multiple training input instances and corresponding training output signals, and to access the set of parameters of the function; and a processor interface configured to train the function by:
  determining an output signal of the function for a training input instance of the training input instances by:
    identifying a number of reference instances of the multiple reference instances as parent instances of the training input instance based on a similarity between the training input instance and the multiple reference instances determined according to a similarity function,
    determining an aggregate latent representation for the training input instance based on aggregating representations or reference output signals of the identified parent instances using an aggregation function, and
    determining the output signal based on the aggregate latent representation for the training input using an output function;
  deriving a training signal by comparing the determined output signal for the training input instance to the corresponding training output signal for the training input instance;
  adjusting at least a representation of a reference instance of the reference instances according to the training signal to obtain a reference instance not included in the training dataset; and
  determining a confidence value of the function for the input instance based on (i) sampling multiple output signals or (ii) determining a probability distribution of the output signal is determined;
wherein the autonomous or semi-autonomous vehicle is controlled based on the output signal and the confidence value.

12. A system for applying a function for controlling an autonomous or semiautonomous vehicle operating in an environment, the function mapping an input instance including one or more sensor measurements to an output signal for use in the controlling, the function being parameterized by a set of parameters, the set of parameters including representations of multiple reference instances, the system comprising:

a data interface configured to access the parameters of the function;

a sensor interface configured to obtain the one or more sensor measurements, the sensor measurements being of one or more sensors; and a processor subsystem configured to:
  obtain the input instance by obtaining the one or more sensor measurements via the sensor interface,
  identify a number of reference instances of the multiple reference instances as parent instances of the input instance based on a similarity between the input instance and the multiple reference instances determined using a similarity function;
  determine an aggregate latent representation for the input instance based on aggregating data representing the identified parent instances using an aggregation function;
  determine the output signal based on the aggregate latent representation for the input instance using an output function;
  determine a confidence value of the function for the input instance based on (i) sampling multiple output signals or (ii) determining a probability distribution of the output signal; and
  control the autonomous or semi-autonomous vehicle based on the output signal and the confidence value;
wherein a representation of a reference instance includes a representation of the reference instance in a latent space of the similarity function or the determination of the aggregate latent representation includes determining output signals of the function for the identified parent instances using the output function.

13. A non-transitory computer-readable medium on which is stored instructions for training a function for use in controlling an autonomous or semiautonomous vehicle operating in an environment, the function mapping an input instance including one or more sensor measurements to an output signal for use in the controlling, the function being parameterized by a set of parameters, the set of parameters including representations of multiple reference instances, the instructions, when executed by a processor system, causing the processor system to perform the following steps:

accessing a training dataset for training the function, the training dataset including multiple training input instances and corresponding training output signals;

training the function by:
  determining an output signal of the function for a training input instance of the training input instances, including:
    identifying a number of reference instances of the multiple reference instances as parent instances of the training input instance based on a similarity between the training input instance and the multiple reference instances determined according to a similarity function,
    determining an aggregate latent representation for the training input instance based on aggregating representations or reference output signals of the identified parent instances using an aggregation function, and determining the output signal based on the aggregate latent representation for the training input instance using an output function;

deriving a training signal by comparing the determined output signal for the training input instance to the corresponding training output signal for the training input instance;

adjusting at least a representation of a reference instance of the reference instances according to the training signal to obtain a reference instance not included in the training dataset; and determining a confidence value of the function for the input instance based on (i) sampling multiple output signals or (ii) determining a probability distribution of the output signal;

wherein the autonomous or semi-autonomous vehicle is controlled based on the output signal and the confidence value.

14. A non-transitory computer-readable medium on which is stored instructions for applying a function for controlling an autonomous or semiautonomous vehicle operating in an environment, the function mapping an input instance including one or more sensor measurements to an output signal for use in the controlling, the function being parameterized by a set of parameters, the set of parameters including representations of multiple reference instances, the instructions, when executed by a processor system, causing the processor system to perform the following steps:

accessing the set of parameters of the function;

obtaining the input instance, including obtaining the one or more sensor measurements, the sensor measurements being of one or more sensors;

identifying a number of reference instances of the multiple reference instances as parent instances of the input instance based on a similarity between the input instance and the multiple reference instances determined using a similarity function;

determining an aggregate latent representation for the input instance based on aggregating data representing the identified parent instances using an aggregation function;

determining the output signal based on the aggregate latent representation for the input instance using an output function;

determining a confidence value of the function for the input instance based on (i) sampling multiple output signals or (ii) determining a probability distribution of the output signal; and controlling the autonomous or semi-autonomous vehicle based on the output signal and the confidence value;

wherein a representation of a reference instance of the reference instances includes a representation of the reference instance in a latent space of the similarity function or determining the aggregate latent representation includes determining output signals of the function for the identified parent instances using the output function.

* * * * *